(12) United States Patent
Gijsman et al.

(10) Patent No.: US 7,858,675 B2
(45) Date of Patent: Dec. 28, 2010

(54) COMPOSITION WITH POLYMER AND AN OXIDATION-CATALYST

(75) Inventors: Pieter Gijsman, Beek (NL); Johan Franz Gradus Antonius Jansen, Geleen (NL)

(73) Assignee: DSM IP Assets B.V., Heerlen (NL)

( * ) Notice: Subject to any disclaimer, the term of this patent is extended or adjusted under 35 U.S.C. 154(b) by 0 days.

(21) Appl. No.: 12/373,148

(22) PCT Filed: Jul. 4, 2007

(86) PCT No.: PCT/EP2007/005906

§ 371 (c)(1),
(2), (4) Date: Oct. 19, 2009

(87) PCT Pub. No.: WO2008/006492

PCT Pub. Date: Jan. 17, 2008

(65) Prior Publication Data

US 2010/0048764 A1 Feb. 25, 2010

(30) Foreign Application Priority Data

Jul. 11, 2006 (EP) .................. 06017792

(51) Int. Cl.
*C08K 5/56* (2006.01)
*C08K 5/098* (2006.01)

(52) U.S. Cl. .................. 523/124; 523/125; 523/126; 524/394; 524/400

(58) Field of Classification Search .............. 523/124, 523/125, 126; 524/394, 400
See application file for complete search history.

(56) References Cited

U.S. PATENT DOCUMENTS

| 3,941,759 A | 3/1976 | Taylor et al. |
|---|---|---|
| 4,380,597 A | 4/1983 | Erwied et al. |
| 5,350,783 A | 9/1994 | Reich |
| 2002/0035236 A1 | 3/2002 | Van Benthem |
| 2004/0010063 A1* | 1/2004 | Kuroki et al. ............... 524/306 |
| 2004/0086749 A1 | 5/2004 | Kennedy |
| 2004/0129554 A1 | 7/2004 | Solis et al. |
| 2005/0104033 A1 | 5/2005 | Schmidt |
| 2010/0130695 A1 | 5/2010 | Gijsman et al. |

FOREIGN PATENT DOCUMENTS

| EP | 1 032 038 | 8/2000 |
|---|---|---|
| EP | 1 705 216 | 9/2006 |
| EP | 1 772 502 | 4/2007 |

OTHER PUBLICATIONS

International Search Report for PCT/EP2007/005906, mailed Sep. 26, 2007.
Database WPI Week 198649, Accession No. 1986-322279 and JP 61-238836 (Oct. 24, 1986), abstract.
Database WPI Week 200439, Accession No. 2004-413938 and JP2004-081836 (Mar. 18, 2004), abstract.

* cited by examiner

*Primary Examiner*—Kriellion A Sanders
(74) *Attorney, Agent, or Firm*—Nixon & Vanderhye P.C.

(57) ABSTRACT

The invention relates to a process for increasing the rate of oxo-biodegradation of a carbon-containing polymer which process at least comprises the step of adding a component containing at least one 1,2-oxo-hydroxy-moiety as an oxidation catalyst to the carbon-containing polymer. The invention further relates to a composition with an increased rate of oxo-biodegradability that is obtained by the process of the invention and to the product with increased rate of oxo-biodegradability made from the composition.

7 Claims, No Drawings

COMPOSITION WITH POLYMER AND AN OXIDATION-CATALYST

This application is the U.S. national phase of International Application No. PCT/EP2007/005906, filed 4 Jul. 2007 which designated the U.S. and claims priority to EP Application No. 06017792.0, filed 11 Jul. 2006, the entire contents of each of which are hereby incorporated by reference.

The present invention relates to a process for improving the biodegradability of a polymer, more specifically a process for increasing the rate of oxo-biodegradation of a carbon-containing polymer. It is known to add to polymers substances that promote their degradation so that they disintegrate and subsequently biodegrade in the environment. A number of applications of these systems have become important in recent years in order to reduce the amount of plastic waste being buried in landfill and to return carbon-based polymers to the biological cycle in the form of compost or after degradation by spreading on land. One important application of biodegradable plastics is in short-term applications (e.g. food packaging and landfill covers), where the product lifetime has to be just long enough to provide the appropriate shelf life and the service life required by the user of the product. This requirement has in the past been achieved by the addition of transition metal ions to the carbon-containing polymers, which transition metal ions promote oxidation and thus degradation of the polymer. A disadvantage of this method of using transition metal catalysts for accelerating the oxygen uptake is that it will be unavoidable that part of the transition metal will be causing environmental pollution. It is needless to say that this is not desirable.

Such a prior art method is known from U.S. Pat. No. 5,350,783 wherein it is described that thermoplastic products are degraded into low molecular weight materials with enhanced biodegradability in the presence of a composting promoting agent. The composting promoting agent is chosen from the group of non-metallic metal complexing agents, non-oxidizing metal complexing agents. The composting promoting agent converts in the presence of an oxidizing metal compound to an active oxidant. Some examples mentioned of the composting promoting agent are beta-diketones (1,3-diketones) and beta-keto-esters. The composting promoting agent needs always to be combined with an oxidizing metal compound. Examples of the oxidizing metal compound given are iron, copper, manganese, cobalt, cerium, silver, chromium and nickel.

The aim of the present invention is to overcome the above-mentioned disadvantages and to provide a process for increasing the rate of oxo-biodegradation of a carbon-containing polymer without the need to use environmentally suspect metals and still to reach desirable and acceptable rates of oxo-biodegradation.

This aim is reached by providing a process for increasing the rate of oxo-biodegradation of a carbon-containing polymer which process at least comprises the step of adding an oxidation catalyst to the carbon-containing polymer. A suitable oxidation catalyst is a component containing at least one 1,2-oxo-hydroxy-moiety. Preferably, the component containing at least one 1,2-oxo-hydroxy-moiety contains at least one 1,2-oxo-hydroxy-moiety according to formula I

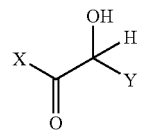

with X and Y being identical or different from each other, and representing respectively:

X: OR, SR, $NR_1R_2$, R, $O^-M^+$;

Y: OR, SR, $NR_1R_2$, R;

R, $R_1$, $R_2$: a group selected independently from one another from the groups consisting of H, an optionally substituted $C_1$-$C_{20}$ alkyl group, an optionally substituted $C_6$-$C_{20}$ aryl group, an optionally substituted $C_7$-$C_{20}$ alkylaryl group, and an optionally substituted $C_7$-$C_{20}$ arylalkyl group, $M^+$ being an alkaline metal cation or earth alkaline metal cation, or an ammonium ion and wherein X and Y may be joined together to form a cyclic structure of at least 5 carbon atoms, and/or with any of X or Y representing an oligomeric or a polymeric residue, which can optionally be substituted.

Preferably, X and/or Y being R, more preferably X and Y are R, even more preferably, X and/or Y is an optionally substituted $C_6$-$C_{20}$ aryl group or an optionally substituted $C_7$-$C_{20}$ arylalkyl group; or X is an optionally substituted $C_1$-$C_{20}$ alkyl group and Y is an optionally substituted $C_6$-$C_{20}$ aryl group. In another preferred embodiment, X is OH. In another preferred embodiment, X is an optionally substituted alkoxy group with 1-20 carbon atoms and Y is an optionally substituted $C_6$-$C_{20}$ aryl group. In still another preferred embodiment of the invention, X is an $O^-M^+$, with $M^+$ representing an alkaline metal cation or earth alkaline metal cation, or an ammonium ion. When X and Y are joined together to form a cyclic structure, than the cyclic structure preferably contains at least 7 carbon atoms.

Examples of substituents to the alkyl-, aryl-, alkylaryl- or arylalkyl group are, groups such as halogens, amine groups, alcohols, ethers, esters, ketones, aldehydes, polyalkyleneoxy residues, carboxylates, anhydrides, amides, ureas or urethanes.

Examples of polymeric residues are, for instance, polyethylene, polypropylene, polystyrene, polyethylene oxide, polypropylene oxide, polycarbonate, polyurethane or polyester.

Preferably, from a processability point of view the composition of the present invention contains a component containing at least one 1,2-oxo-hydroxy-moiety with a molecular weight of at least 200 g/mol, more preferably at least 350 g/mol, even more preferably at least 500 g/mol. The molecular weight of the 1,2-oxo-hydroxy-moiety containing component is expressed as the number average molecular weight (Mn) as determined by mass spectrometry. More preferably the composition of the present invention contains at least one 1,2-oxo-hydroxy-moiety according to formula I as described above, with a molecular weight of at least 200 g/mol, more preferably at least 350 g/mol and most preferably at least 500 g/mol. Components with lower molecular weights are less preferred as they are difficult to use in the compounding process.

In case the component containing at least one 1,2-oxo-hydroxy-moiety is citric acid or tartaric acid, the composition is preferably essentially free of transition metals, most preferably free of transition metal. In case the component containing at least one 1,2-oxo-hydroxy-moiety contains a 1,2-oxo-hydroxy-moiety according to formula I with X is OH, the composition is preferably essentially free of transition metals, most preferably free of transition metal. With "essentially free of transition metals" is here and hereinafter meant that the transition metal concentration is lower than 10 ppm (parts per million). More preferably the transition metal concentration is lower than 5 ppm and even more preferably lower than 1 ppm, calculated on the total weight of the composition. Most preferably the composition is free of transition metal.

The amount of component containing at least one 1,2-oxo-hydroxy-moiety in the composition may vary within rather wide ranges, and may be chosen depending on the kind of application in which the composition of the invention is applied. The skilled man can easily assess by routine experimentation, in dependence of the type of application selected, which amount thereof leads to good results.

Preferably, the amount of component containing at least one 1,2-oxo-hydroxy-moiety in the composition is at least 0.001 wt %, preferably at least 0.01 wt % and even more preferably at least 0.05 wt %, calculated on the total weight of the composition. Preferably, the amount of component containing at least one 1,2-oxo-hydroxy-moiety in the composition is lower than 80 wt %. Preferably the amount of the 1,2-dioxo-moiety is between 0.1 wt % and 50 wt %, more preferably this amount is between 0.2 wt % and 20 wt %. When the component containing at least one 1,2-oxo-hydroxy-moiety is used in the process in the form of a masterbatch, the amount of component containing at least one 1,2-oxo-hydroxy-moiety in the masterbatch is preferably between 2 and 80 wt %. Here and hereinafter when numerical ranges are described the upper and lower limits are included to be in the range.

As the skilled man will understand from the foregoing, it is also possible to use more than one component containing at least one 1,2-oxo-hydroxy-moiety. In such a situation the mentioned amounts refer to the total of components containing at least one 1,2-oxo-hydroxy-moiety.

Suitable components containing at least one 1,2-oxo-hydroxy-moiety can either be bought commercially or prepared according to the following general method. 1-Hydroxy-2-oxo derivatives can be prepared by condensing the appropriate aldehydes using thiazolium chloride as a catalyst (H. Stetter and H. Kuhlmann, "Acyloin condensation by thiazolium ion catalysis", Organic Syntheses, Coll. Vol. 7, p. 95 (1990); Vol. 62, p. 170 (1984).)

The carbon-containing polymer that can be used in the composition according to the present invention is not particularly critical and will generally be determined by the envisaged use of the final polymer composition The carbon-containing polymer is preferably an oxidisable carbon-containing polymer excluding unsaturated polyesters. For use in the present invention not only homopolymers are suitable but also copolymers and blends of suitable homo- and/or copolymers can be used.

More preferably the carbon-containing polymer is a polymer that can degrade in an outdoor environment, primarily by an oxidative mechanism, to give, after complete oxo-biodegradation, mainly carbon dioxide and water. Preferred polymers are saturated polyolefins, for example very low density polyethylene, low density polyethylene, linear low density polyethylene, high density polyethylene, polypropylene and their copolymers; styrene (co) polymers and its blends with polyunsaturated polymers; unsaturated polymers such as polydiene rubber, for example cis-polyisoprene (natural or synthetic); polybutadiene; styrene-butadiene; copolymers of unsaturated polymers with saturated polymers, such as acrylonitrile-butadiene-styrene (ABS); and block co-polymers, for example styrene-butadiene-styrene (SBS); polymers containing ester linkages for example polyethylene terephthalate, polybutylene terephthalate, polybutylene succinate terephthalate, polybutylene adipate terephthalate polylactide (co) polymers, polycaprolactone, polyhydroxyalkanoates (like polyhydroxybutyrate), polyesteramides; polymers containing amide linkages for example polyamide 6, polyamide 66, polyamide 46; polymers containing ether linkages like polyethyleneglycol, polypropyleneglycol, polytetrahydrofuran and mixtures and block copolymers of any of the foregoing polymers. Most preferably low density polyethylene, linear low density polyethylene, high density polyethylene, polypropylene and their copolymers; styrene (co) polymers and its blends with polyunsaturated polymers is used.

It is convenient and operationally preferably to pre-form a concentrate (a so-called "masterbatch") of the component containing at least one 1,2-oxo-hydroxy-moiety in a suitable carbon-containing polymer. This carbon-containing polymer in the masterbatch may be the same as the carbon-containing polymer to which it is to be added, however it is also possible to add the component containing at least one 1,2-oxo-hydroxy-moiety to another type of carbon-containing polymer than the carbon-containing polymer in the final, envisaged composition. The "masterbatch", comprising the component containing at least one 1,2-oxo-hydroxy-moiety and the carbon-containing polymer, can be added to the carbon-containing polymer of the final composition by any suitable method known to the man skilled in the art. Examples of suitable techniques are extruding, mixing or dry-blending.

The required concentration of the component containing at least one 1,2-oxo-hydroxy-moiety in the final carbon-containing polymer can be reached by dilution; thus by adding as much masterbatch to the final carbon-containing polymer as necessary to reach the desired concentration of the component containing at least one 1,2-oxo-hydroxy-moiety in the final carbon-containing polymer. The man skilled in the art can easily calculate, when knowing the "loading" of the masterbatch, the amount of masterbatch needed to reach the desired level of component containing at least one 1,2-oxo-hydroxy-moiety in the final composition. With the "loading" of the masterbatch is meant the amount of component containing at least one 1,2-oxo-hydroxy-moiety present in the carbon-containing polymer that is used to prepare the masterbatch with. Normally the loading will be expressed as a percentage by weight. With "final composition" is here and hereinafter meant the composition containing the component containing at least one 1,2-oxo-hydroxy-moiety and the carbon-containing polymer. When a masterbatch is used wherein another type of carbon-containing polymer is used than the carbon-containing polymer that needs to be activated by the oxidation catalyst, the amount of carbon-containing polymer from the masterbatch is included in the calculation of the final composition.

Next to the "masterbatch method" to prepare the composition also other methods are possible and generally known to the man skilled in the art. It is also possible to mix the carbon-containing polymer with the component containing at least one 1,2-oxo-hydroxy-moiety in the desired amount from the beginning, this contrary to the masterbatch method where first a composition, a "masterbatch", is prepared with a higher amount of the component containing at least one 1,2-oxo-hydroxy-moiety than finally desired in the polymer composition. The above mentioned mixing step can be performed as a separate step or as a step in the process of manufacturing an article from the polymer composition.

Another method to prepare the polymer composition is by "solvent blending" the component containing at least one 1,2-oxo-hydroxy-moiety with the carbon-containing polymer. Solvent blending is especially suitable for 1,2-oxo-hydroxy-moiety components with a relatively low molecular weight.

The mixing, either for the "masterbatch method" or for the "direct method", can be conducted in the equipment generally known in the art, such as for example extruders and mixers. Mixing can occur by melt-mixing, i.e. the mixing takes place above the melting point of the carbon-containing polymer but below its decomposition temperature.

The inventors have found that in the process according to the invention the rate of oxo-biodegradation can be further enhanced by adding a co-catalyst to the composition comprising the carbon-containing polymer and the component containing at least one 1,2-oxo-hydroxy-moiety. A suitable co-catalyst for this process is an alkaline metal salt or earth alkaline metal salt or an ammonium salt. The invention therefore also relates to a process according to the invention wherein the process further comprises the step of adding an alkaline metal salt, earth alkaline metal salt or ammonium salt to the composition comprising the carbon-containing polymer and the component containing one 1,2-oxo-hydroxy-moiety.

It is also possible and within the scope of the present invention to use a combination of two or more co-catalysts. Thus the composition than comprises a carbon-containing polymer, at least one component containing at least one 1,2-oxo-hydroxy-moiety and at least one of an alkaline metal salt or earth alkaline metal salt or an ammonium salt, as a co-catalyst.

Suitable anions in these salts are for example carboxylate, nitrate, borate, halogenide, sulphite, sulphate or hydroxide. Preferably, the alkaline metal salt or earth alkaline metal salt is a K-, Li- or Na-salt, more preferably a K-, Li- or Na-carboxylate, most preferably a K-carboxylate.

Generally, the carboxylates that can suitably be used in this preferred embodiment of the invention will be carboxylates having from 2 to 50 carbon atoms. Suitable carboxylates that can be used in this preferred embodiment of the present invention are, for instance, propionate, acetate, ethylhexanoate, lactate or butyrate. Another suitable class of carboxylates are the anions from fatty acids, either saturated, mono-unsaturated or poly-unsaturated fatty acids. Suitable examples are stearates, palmitates, linoleates, linolenates and oleates. Preferably carboxylates having at least 4 carbon atoms are used. Preferably the carboxylates have less than 40 carbon atoms. More preferably the carboxylates have between 6 and 32 carbon atoms. Within this range the most advantageous balance between the ease of compounding and the efficiency of the co-catalyst is reached.

Preferably, the amount of the alkaline metal salt or earth alkaline metal salt or ammonium salt, if present, in the composition is at least 0.001 wt %, preferably at least 0.01 wt % and even more preferably at least 0.1 wt %, calculated as the salt on the total weight of the composition. Preferably, the amount of alkaline metal salt or earth alkaline metal salt or ammonium salt in the composition is lower than 80 wt %, more preferably lower than 50 wt %. A very advantageous range is between 0.1 and 50 wt %, more preferably between 0.2 wt % and 10 wt %.

The co-catalyst can be added in the same manner and with the same methods as described above for the addition of the oxidation catalyst to the polymer.

In specifically preferred embodiments of the invention, the composition obtained by the process of the invention is essentially free of cobalt, most preferably free of cobalt. With "essentially free of cobalt" is here and hereinafter meant that the cobalt concentration is lower than 10 ppm (part per million). Preferably the cobalt concentration is lower than 5 ppm and even more preferably lower than 1 ppm, calculated on the total weight of the composition. Even more preferably, the composition of the invention is essentially free of transition metal, most preferably free of transition metal. With "essentially free of transition metals" is here and hereinafter meant that the transition metal concentration is lower than 10 ppm. Preferably the transition metal concentration is lower than 5 ppm and even more preferably lower than 1 ppm, calculated on the total weight of the composition.

To increase the processability and to adapt the life time of the oxidisable carbon containing polymer, stabilizers can be added. One class of stabilizers that can be added are the primary antioxidants like phenolic antioxidants and aromatic amines. Examples of these primary antioxidants are: 2,6-di-t-butyl-4-methylphenol, 2,6-di-t-butyl-4-ethyl-phenol, benzenepropanoic acid, 3,5-bis(1,1-dimethylethyl)-4-hydroxy-octadecyl ester, 2,2'-methylenebis(6-t-butyl-4-methylphenol), 2,2'-methylenebis 6-(1-methylcyclohexyl)-p-cresol, 4,4'-butylidenebis(6-t-butyl-3-methyl-phenol), bis-(2-t-butyl-4-methyl-6-(3-t-butyl-5-methyl-2-hydroxy-benzyl)-phenyl)-terephthalate, 1,1,3-tris (2-methyl-4-hydroxy-5-t-butyl phenyl)butane, 1,3,5-trimethyl-2,4,6-tris (3,5-di-t-butyl-4-hydroxybenzyl)benzene, butyric acid, 3,3-bis(3-t-butyl-4-hydroxyphenyl)ethylene ester, 1,3,5-tris(3', 5'-di-t-butyl-4'-hydroxybenzyl)-s-triazine-2,4,6-(1H,3H,5H) trione, 1,3,5-tris(4-t-butyl-2,6-dimethyl-3-hydroxy-benzyl)-iso-cyanurate, 3-(3,5-di-t-butyl-4-hydroxy-phenyl)propion acid ester with 1,3,5-tris(2-hydroxy-ethyl)-iso-cyanurate, tetrakis[methylene(3,5-di-t-butyl-4-hydroxyhydrocinnamate)] methane, N,N'-hexamethylene bis(3,5-di-t-butyl-4-hydroxy-hydrocinnamamide, 3,9-bis(1,1-dimethyl-2-(β-(3-t-butyl-4-hydroxy-5-methyl-phenyl)-propyonyl-oxy)-ethyl)-2,4,8,10-tetraoxospiro, 2,2'-ethylidenebis(4,6-di-t-butylphenol), 4,4'-methylenebis(2,6-di-t-butylphenol), tri-ethylene-glycol-bis-3-(t-butyl-4-hydroxy-5-methyl-phenyl)-propionate, 1,6-hexane-diol-bis-3-(3,5-di-t-butyl-4-hydroxyphenyl)-propionate, butylated hydroxyanisole, 2,6-di-t-butyl-4-sec-butyl-phenol, [2-propyleneacid, 2-isopentane-6-[(3-isopentane-2-hydroxy-5-isopentane-phenyl)-ethyl]-4-methyl-phenyl-ester], [2-propylene-acid, 2-t-butyl-6-[(3-t-butyl-2-hydroxy-5-methyl-phenyl)-methyl]-4-methyl-phenyl-ester], p-cresol/dicyclopentadiene butylated reaction product, di-ethyl-ester of 3,5-di-t-butyl-4-hydroxy-benzyl-phosphoric acid, 2,5,7,8-tetra-methyl-2-(4',8',12'-tri-methyl-tri-decyl)-6-chromanol, N,N'-1,3-propanediylbis(3,5-di-t-butyl-4-hydroxyhydrocinnamamide, calcium bis[monoethyl (3,5-di-t-butyl-4-hydroxybenzyl)phosphonate, 4,4'-di-cumyl-di-phenyl-amine and 2,2,4-trimethyl-1,2-dihydroquinoline polymer.

Another class of stabilizers that can be added are the secondary antioxidants like the phosphites and the thioethers. Examples of these secondary antioxidants are: trisnonylphenyl phosphite, tris(2,4-di-t-butylphenyl)phosphite, 2,2-methylene-bis-(4,6-di-tbutyl-phenyl)-octyl-phosphite, 2,2'-ethylidenebis(4,6-di-t-butylphenyl)fluorophosphonite, bis(2,4-di-tert-butyl-6-methylphenyl)ethyl phosphite, 2,4,6 tri-t-butylphenyl-2-butyl-2-ethyl-1,3-propane-diol-phosphite, distearyl pentaerythritol diphosphite, tetrakis-(2,4-di-tert-butyl-phenyl)-4,4'-bi-phenylene-di-phosphonite, bis(2,4-di-t-butylphenyl)pentaerythritol diphosphite, bis-(2,6-di-tbutyl-4-methylphenyl)-pentaerythritol-di-phosphite, bis-(2,4-dicumylphenyl)-pentaerythritol-diphosphite, 1,3-bis-(diphenylphosphino)-2,2-dimethyl-propane, 2,2',2"-nitrilo triethyl-tris[3,3',5,5'-tetratert-butyl-1,1'-biphenyl-2,2'-diyl] phosphite, dilauryl thiodipropionate, dimyristyl thiodipropionate, distearyl thiodipropionate, distearyl disulfide and pentaerythrityl tetrakis(β-laurylthiopropionate)

To regulate the life time in outdoor conditions, UV stabilizers like UV absorbers and Hindered Amine stabilizers (HALS) can be added to the oxidisable carbon containing polymer. Examples of the UV-absorbers are hydroxy-benzophenones like 2-hydroxy-4-n-octoxybenzophenone, 2-hydroxy-4-n-dodecyloxy-benzophenone; hydroxy-benzotriazoles like: 2-(2'-hydroxy-3'-t-butyl-5'-methylphenyl)-5-chlorobenzotriazole, 2-(2-hydroxy-5-t-octylphenyl)benzotriazole, bis[2-hydroxy-5-t-octyl-3-(benzotriazol-2-yl)phenyl]methane, 2-[2-hydroxy-3,5-di(1,1-dimethylbenzyl)phenyl]2H-benzotriazole and other types like the oxalanilides, hydroxybenzoates, diphenylacrylates and hydroxytriazines. Examples of the HALS stabilizers are: alkylsubstituted piperidyl-, piperidinyl- or piperazinone containing compounds as e.g.: 2,2,6,6-tetramethyl-4-piperidone, 2,2,6,6-tetramethyl-4-piperidinol, bis-(1,2,2,6,6-pentamethylpiperidyl)-(3',5'-di-tert-butyl-4'-hydroxybenzyl)-butylmalonate, di-(2,2,6,6-tetramethyl-4-piperidyl)-sebacate, dimethyl succinate polymer with 4-hydroxy-2,2,6,6-tetramethyl-1-piperidine ethanol, poly[[6-[(1,1,3,3-tetramethylbutyl)amino]-s-triazine-2,4-diyl][2,2,6,6-tetramethyl-4-piperidinyl)imino]hexamethylene[(2,2,6,6-tetramethyl-4-piperidinyl)imino]]}, bis-(2,2,6,6-tetramethyl-4-piperidinyl)-succinate, bis-(1-octyloxy-2,2,6,6-tetramethyl-4-piperidinyl)-sebacate, bis-(1,2,2,6,6-pentamethyl-4-piperidinyl)-sebacate, tetrakis-(2,2,6,6-tetramethyl-4-piperidyl)-1,2,3,4-butaan-tetracarboxylate, N,N'-bis-(2,2,6,6-tetramethyl-4-piperidyl)-hexane-1,6-diamine-N-butyl-2,2,6,6-tetramethyl-4-piperidinamine, 2,2'-[(2,2,6,6-tetramethyl-piperidinyl)-imino]-bis-[ethanol], poly((6-morfoline-S-triazine-2,4-diyl)(2,2,6,6-tetramethyl-4-piperidinyl)-iminohexamethylene-(2,2,6,6-tetramethyl-4-piperidinyl)-imino), 5-(2,2,6,6-tetramethyl-4-piperidinyl)-2-cyclo-undecyl-oxazole), 1,1'-(1,2-ethaan-di-yl)-bis-(3,3',5,5'-tetramethyl-piperazinone)-8-acetyl-3-dodecyl-7,7,9,9-tetramethyl-1,3,8-triazaspiro(4,5)decaan-2,4-dion, polymethylpropyl-3-oxy-[4(2,2,6,6-tetramethyl)-piperidinyl)-siloxane, 1,2,3,4-butane-tetracarboxylzuur-1,2,3-tris(1,2,2,6,6-pentamethyl-4-piperidinyl)-4-tridecylester, copolymer of alfa-methylstryrene-N-(2,2,6,6-tetramethyl-4-piperidinyl)maleimide and N-stearyl-maleimide, N-2,2,6,6-tetrametyl-4-piperidinyl-N-amino-oxamide, 4-acryloyloxy-1,2,2,6,6-pentamethyl-4-piperidine, mixtures of esters of 2,2,6,6-tetramethyl-4-piperidinol and fatty acids, 1,5,8,12-tetrakis[2',4'-bis(1'',2'',2'',6'',6''-pentamethyl-4'-piperidinyl (butyl)amino)-1',3',5'-triazin-6'-yl]-1,5,8,12-tetraazadodecane, The composition according to the invention might further contain: fillers, other biodegradable components, photo-initiators and pigments. Preferably all these components have a particle size of less than 150 mesh. Fillers may be selected from the inorganic carbonates, synthetic carbonates, talc, magnesium hydroxide, aluminium trihydrate, diatomaceous earth, mica, natural or synthetic silicas and calcinated clays or mixtures thereof. An example of a photoinitiator is benzophenone. Examples of other degradable components are starch or poly-(lactic acid), poly-(caprolactone), poly-(hydroxybutyrate and/or valerate), poly-(ethylenadipate). Examples of pigments are carbon black and titanium dioxide.

The invention also relates to a composition with an increased rate of oxo-biodegradation obtained by the process according to the invention. The invention further relates to the use of such a composition for the preparation of a product with an increased rate of oxo-biodegradation and the obtained product with an increased rate of oxo-biodegradation.

By using the process according to the invention, which at least comprises the step of adding an oxidation catalyst to the carbon-containing polymer and optionally adding a co-catalyst, a composition can be obtained that has an improved rate of oxo-biodegradation even in the absence of a transition metal degradation catalyst. The composition can advantageously be used for the preparation of a product with an increased rate of oxo-biodegradation. This type of products is advantageously found within the segment of products with a controlled or limited lifetime.

With "limited lifetime" is here and hereinafter meant that the lifetime of the product is less than 2 years, preferably less than 1 year. With "lifetime" is here and hereinafter meant the time wherein the properties of the product are still sufficient for the product to fulfill its purpose. Preferably the physical properties remain sufficient during its lifetime. With properties remain "sufficient" is meant that the product can still serve the goal for which it was made, thus for example a plastic bag that is not strong enough anymore to carry the groceries has insufficient properties anymore. Preferably the property is still sufficient when the initial value is reduced to 80%, being a reduction of 20%. With "initial value" is meant the value of the property at the moment the product is made. Thus when a plastic bag is made out of polyethylene and the strength determined on the bag has a value of 100, than the strength is not sufficient anymore when the strength is reduced to 79.

The rate of oxo-biodegradation can be determined as the oxidation rate. The oxidation rate can be determined with different methods. One method is the determination of the accumulation of chemical products with carbonyl groups with FTIR spectroscopy (absorption at 1713 cm$^{-1}$ minus the absorption at 1860 cm$^{-1}$) as a function of exposure time at e.g. 50° C. As criterion for the rate of oxidation of a polymer the time until an increase of the carbonyl groups absorption of 0.1 is reached can be used.

Another method to determine the oxidation rate is to determine the oxygen absorbance of a composition in a closed system filled with oxygen as a function of time at e.g. 50° C., as criterion for the rate of oxidation of a polymer the time until the polymer has absorbed 50 mmol oxygen/kg polymer can be used.

The process for the preparation of a product with an increased rate of degradation comprises at least the steps of feeding a composition obtained by the method according to the invention to a former, forming the composition into the desired shape and removing the shaped product from the apparatus. A former is defined as an apparatus giving the composition a particular shape. Examples of formers are blow-moulding, casting, extruding and film-moulding.

The present invention further relates to the use of the composition obtained by the method according to the invention for the preparation of articles with increased oxo-biodegradability. These articles are made from the composition obtained by the method according to the invention. These articles have an increased rate of oxo-biodegradability compared to articles made from compositions not containing an oxidation catalyst and these articles do not emit environmentally suspect metals from the oxidation catalyst to the environment as compared to other prior art materials.

The present invention also relates to the articles with increased oxo-biodegradability obtained by the use of the composition according to the invention or of the composition obtained by the method according to the invention. The articles according to the invention can take any shape and are thus not limited to a specific shape. The shape will generally be dictated by the use of the article. Non-limiting examples of products that benefit from a controlled or limited lifetime are food packaging, bags (bread, shopping, compost, courier, garbage, poop scoop for pets), bottles, boxes, containers, cups, plastic drink holders and trays, films (blown, cast, shrink, thermoforming, laminated, cling), cutlery, drinking straws, agricultural films (mulch films, greenhouse films), landfill cover, medical and hygienic products (adult incontinence pads, diapers, feminine hygiene pads).

The invention will now be demonstrated by means of a series of examples and comparative examples. All examples are supportive of the scope of claims. The invention, however, is not restricted to the specific embodiments as shown in the examples.

EXPERIMENTAL PART

Preparation of Oxo-Catalysts

Benzoin, hydroxyl acetone and cobalt-acetate were bought from Aldrich and used as received. 13-Hydroxy-12-tetracosanone, poly-suberhydroxyketone and 1,2-bis(4-butylphenyl)-2-hydroxy-1-ethanone were prepared according to the following procedures.

Preparation of 13-hydroxy-12-tetracosanone

To a solution of 6.27 g dodecanal and 10 ml ethanol (99.8%), 458 mg of thiazoliumchloride and 1.4 ml of triethylamine were added. While stirring, the reaction mixture was heated to 80° C., under a slow stream of nitrogen. After 2.5 h, the ethanolic solution was poured into 15 ml of ice-cold water, whereby 13-hydroxy-12-tetracosanone precipitated and could be isolated by filtration. Finally this product was recrystallized from 15 ml of ethanol. After filtration the 13-hydroxy-12-tetracosanone was washed 3 times with 4 ml of ice cold ethanol.

Preparation Poly-Suberhydroxyketone

Poly-suberhydroxyketone was synthesized in a two-step procedure. In step one suberaldehyde was synthesized that was oxidized to poly-suber hydroxyketone in the second step.

Step 1: Synthesis of Suberaldehyde 262 ml of aqueous $NaIO_4$ was added drop wise to a vigorously stirred suspension of 105 g chromatographic grade silica gel in 500 ml dichloromethane whereby a white suspension was formed. To the suspension a solution of 6.1 g cis-1,2-cyclo-octanediol in 100 ml dichloromethane was added. The reaction mixture was stirred over night at room temperature, after which the mixture was filtered whereby the residue was washed 3 times with 100 ml dichloromethane. Finally the filtrate was dried over $NaSO_4$, after which the solvent was removed under reduced pressure.

Step 2: Synthesis of Poly-Suberhydroxyketon 210 mg of thiazoliumchloride was dissolved in 15 ml ethanol (99.8%) after which 474 µl triethylamine was added. To the reaction mixture, a solution of 2 g suberaldehyde obtained in step 1 in 15 ml dichloromethane was added dropwise. While stirring, the reaction mixture was heated to 80° C. for 6 hours under a slow stream of nitrogen. After 16 hours of stirring at room temperature (23° C.) the ethanolic solution was poured into a separatory funnel containing 20 ml water/100 ml dichloromethane. The organic layer was washed with respectively 20 ml and 20 ml Brine. Finally the organic layer was dried over $NaSO_4$, after which the solvent was removed under reduced pressure.

Synthesis of 1,2-bis(4-butylphenyl)-2-hydroxy-1-ethanone

To a solution of 159 mg thiazolium catalyst in 5 ml ethanol was added 2.06 ml 4-butylbenzaldehyde and 0.47 ml triethylamine. The reaction mixture was stirred over night at 80° C., after which it was cooled to room temperature. The ethanol was removed by evaporation in vacuum and the product was dissolved in dichloromethane. The organic layer was washed with saturated bicarbonate and brine, dried over sodium sulfate, filtered and concentrated. The product was purified by column chromatography with a silica gel column and as eluent pentane/ethyl acetate (9:1)

Preparation of Solvent Blended Compounds

Different catalysts were added to a polypropylene powder (iso-tactic PP with a solution viscosity in decalin at 135° C. of 1.58 dg/) by solvent blending (adding the catalyst as a solution followed by evaporation of the solvent) resulting in a polymer compound. The effect of the catalysts on the oxo-biodegradability of PP was determined as the effectivity on the oxygen uptake rate.

Examples I-III and Comparative Experiments A-B

Determination of the Effectivity of the Catalysts

The effectivity of the catalysts on the oxygen uptake rate of the PP was determined. In a vessel of 65 ml, to which a pressure transducer was connected, 1 gram polymer compound was brought into contact with an atmosphere containing 100% oxygen. The drop of the pressure in the vessel at 50° C. was recorded. From the drop in pressure, the oxygen uptake was calculated.

As a measure of the activity of the catalysts, the time to an oxygen uptake of 50 mmol/kg was determined. The results are shown in Table 1.

TABLE 1

| Example | Catalyst. | Amount (wt %) | Co-catalyst | Amount (wt %) | Time (hrs) |
|---|---|---|---|---|---|
| I | Benzoin | 1 | Potassium octanoate | 0.25 | 36 |
| II | Hydroxyacetone | 1 | Potassium octanoate | 0.25 | 220 |
| III | 1,2-bis(4-butylphenyl)-2-hydroxy-1-ethanone | 1 | Potassium octanoate | 0.25 | 200 |
| A | — | — | — | — | >1000 |
| B | Cobalt-acetate | 0.1 | | | >120 |

The examples and comparative experiments clearly demonstrate the increased oxygen uptake capacity of compositions according to the invention.

Preparation of Oxygen Scavenging Films

Different catalysts were melt-mixed with polypropylene. The mixing was carried out at a barrel temperature of 190° C., a rotation speed of 120 rpm and a residence time of 3 minutes. All experiments were carried out under nitrogen atmosphere. Information regarding these samples is given in Table 3. Comparative Experiment C doesn't contain a catalyst nor a co-catalyst. Comparative Experiment D does only contain a co-catalyst, but no catalyst.

All samples were ground under cryogenic conditions. The resulting powders were pressed between flat hot plates into films with a thickness of about 200 micrometer. Pressing conditions were: plates temperature: 190° C., time between plates without pressure: 0.5 min, subsequently pressurizing the system for 2 minutes at 150 kN.

These films were placed in an air venting oven (Binder FDL115) at 50° C. With FT-IR spectroscopy (Perkin Elmer Spectrum One) the increase of the carbonyl absorbance (Absorbance at 1713 cm-1 minus the absorption at 1860 cm-1) was measured as a function of oven residence time. As degradation criterion the time until an increase of this carbonyl absorption of 0.1 was reached is mentioned in Table 2.

TABLE 2

| Example | Catalyst | Amount (wt %) | Co-catalyst | Amount (wt %) | Time (hrs) |
|---|---|---|---|---|---|
| C | — | — | — | — | >1500 |
| D | — | — | Potassium octanoate | 0.76 | >1500 |
| Example | 13-hydroxy-12-tetracosanone | 1 | | 0.76 | 1250 |
| Example | poly-suberhydroxyketon | 0.4 | Potassium octanoate | 0.6 | 800 |

The invention claimed is:

1. Process for increasing the rate of oxo-biodegradation of a carbon-containing polymer that can degrade in an outdoor environment, primarily by an oxidative mechanism, to give after complete oxo-biodegradation mainly carbon dioxide and water, which process at least comprises the step of adding a component containing at least one 1,2-oxo-hydroxy-moiety according to formula I to the carbon-containing polymer, with the proviso that when X is OH, the composition is essentially free of transition metals:

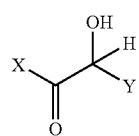

formula I with X and Y being identical or different from each other, and representing respectively:

X: OR, SR, $NR_1R_2$, R, $O^-M^+$;

Y: OR, SR, $NR_1R_2$, R;

R, $NR_1R_2$: a group selected independently from one another from the groups consisting of H, an optionally substituted $C_1$-$C_{20}$ alkyl group, an optionally substituted $C_6$-$C_{20}$ aryl group, an optionally substituted $C_7$-$C_{20}$ alkylaryl group, and an optionally substituted $C_7$-$C_{20}$ arylalkyl group, $M^+$ being an alkaline metal cation or earth alkaline metal cation, or an ammonium ion, and wherein X and Y may be joined together to form a cyclic structure of at least 5 carbon atoms, and/or with any of X or Y representing an oligomeric or a polymeric residue, which can optionally be substituted.

2. Process according to claim 1, wherein the component that contains at least one 1,2-oxo-hydroxy moiety has a molecular weight of at least 200 g/mol.

3. Process according to claim 1, wherein the carbon-containing polymer is an oxidisable carbon-containing polymer excluding an unsaturated polyester.

4. Process according to claim 1, wherein the process further comprises the step of adding an alkaline metal salt, earth alkaline metal salt or ammonium salt to the composition comprising the carbon-containing polymer and the component containing one 1,2-oxo-hydroxy-moiety.

5. Process according to claim 1, wherein the alkaline metal salt or the earth alkaline metal salt is a K-, Li- or Na-salt.

6. Composition obtained by the process according to claim 1.

7. Product with an increased rate of oxo-biodegradation which comprises the composition according to claim 6.

* * * * *